United States Patent [19]

Watanabe

[11] Patent Number: 5,091,973
[45] Date of Patent: Feb. 25, 1992

[54] IMAGE PROCESSING APPARATUS FOR REDUCING VISIBLE ROUGHNESS IN CONTOURS

[75] Inventor: Kiyoshi Watanabe, Kawasaki, Japan

[73] Assignee: Canon Kabushiki Kaisha, Tokyo, Japan

[21] Appl. No.: 572,387

[22] Filed: Aug. 27, 1990

[30] Foreign Application Priority Data

Aug. 30, 1989 [JP] Japan ............................ 1-221670

[51] Int. Cl.$^5$ ............................................. G06K 9/40
[52] U.S. Cl. ................................... 382/54; 382/22
[58] Field of Search ..................... 382/10, 22, 41, 54

[56] References Cited

U.S. PATENT DOCUMENTS 4,618,989 10/1986 Tsukune et al. .................. 382/22
4,790,027 12/1988 Scherl ............................... 382/54
4,849,914 7/1989 Medioni et al. ................... 382/54

*Primary Examiner*—Stephen Brinich
*Attorney, Agent, or Firm*—Fitzpatrick, Cella, Harper & Scinto

[57] ABSTRACT

An image processing apparatus performs processing to input an original image pattern composed of dots, detect contour dots from the inputted original image pattern, and identify a pattern of dot rows formed by the contour dots detected. Editing is performed with regard to the location of a dot row at which the identified pattern is a pattern to undergo editing, whereby the inputted original image pattern is converted into an image pattern represented by intermediate brightness. The image pattern so edited is outputted as by a printer.

21 Claims, 5 Drawing Sheets

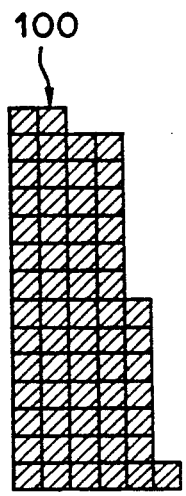
FIG. 4
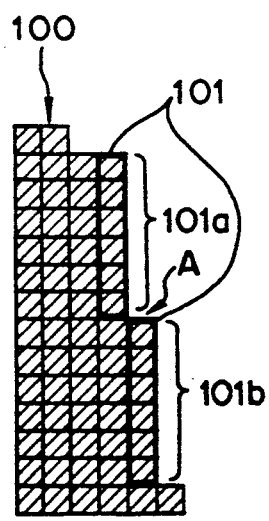 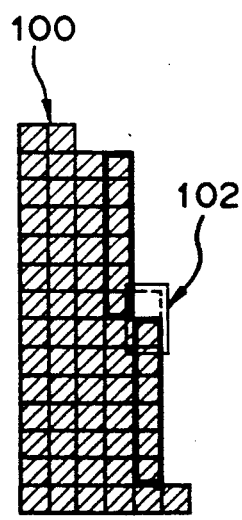 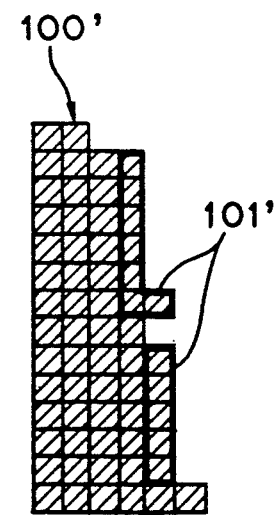
FIG. 5A    FIG. 5B    FIG. 5C

IMAGE PROCESSING APPARATUS FOR REDUCING VISIBLE ROUGHNESS IN CONTOURS

BACKGROUND OF THE INVENTION

1. Field of the Invention

This invention relates to an image processing apparatus and, more particularly, to an image processing apparatus for processing a dot-pattern image typically represented by a font, by way of example.

2. Description of the Related Art

Ordinarily, an image pattern typified by a font used in an electronic image output device such as a printer or CRT is composed of dots. When such a dot pattern is outputted by these output devices, the contour of the outputted image pattern develops a step portion. These step portions produce a visible roughening of the image and become more pronounced the lower the resolution of the device. In particular, when a dot pattern is formed in a case where an incline exists near the auxiliary scanning direction (hereinafter referred to as the "vertical direction") or in the main scanning direction (hereinafter referred to as the "horizontal scanning direction"), as shown in FIG. 1A, step portions are produced, as shown in FIG. 1B. Specifically, the image exhibits pronounced roughening, as represented by the step portions indicated by the arrows P1 through P4.

Despite the fact that the image pattern outputted by the aforementioned image output devices is required to have a much higher quality, the visible roughening of the image is one significant factor that invites a deterioration in the quality of the output image pattern. One method of preventing visible roughening is to provide an image pattern based on a Gray-font scale composed of pixels having different brightness over several step portions, as well as a generating device especially for this pattern. The only result has been to express visible intermediate brightness which corrects for roughness or to raise the resolution possessed by the device.

However, with the example of prior art described above, not only is the construction of the apparatus complicated but costs are higher regardless of the method used.

SUMMARY OF THE INVENTION

An object of the present invention is to solve the aforementioned problems encountered in the prior art.

Another object of the present invention is to provide an image processing apparatus in which visually attractive intermediate brightness can be applied to the contour of an image pattern by means of a simple arrangement.

Still another object of the present invention is to provide an image processing apparatus in which an operator is capable of freely selecting the degree of intermediate brightness applied to the contour of an image pattern.

A further object of the present invention is to provide an image processing apparatus in which it is possible to perform an automatic conversion to a highquality output image pattern wherein roughness of an image pattern contour is not conspicuous.

According to one aspect of the present invention is provide an image processing apparatus comprising input means for inputting an original image pattern composed of dots, detecting means for detecting contour dots from the original image pattern inputted by the input means, identifying means for identifying a pattern of dot rows formed by the contour dots detected by the detecting means, editing means for editing the original image pattern, which is inputted by the input means, based on the pattern identified by the identifying means, and output means for outputting results of editing performed by the editing means.

According to another aspect of the present invention is provided an image processing apparatus comprising input means for inputting an original image pattern composed of dots, detecting means for detecting contour dots from the original image pattern inputted by the input means, identifying means for identifying a pattern of dot rows formed by the contour dots detected by the detecting means, decision means for deciding, based on the pattern identified by the identifying means, editing contents of the original image pattern inputted by the input means, editing means for editing the original image pattern, which is inputted by the input means, in accordance with the editing contents decided by the decision means, and output means for outputting results edited by the editing means.

Other features and advantages of the present invention will be apparent from the following description of the preferred embodiment, taken in conjunction with the accompanying drawings, in which like reference characters designate the same or similar parts throughout the figures thereof.

BRIEF DESCRIPTION OF THE DRAWINGS

FIG. 4 is a diagram showing an example of an image pattern composed of dots;

FIGS. 5A, 5B and 5C are diagrams for describing steps through which contour dots of the image pattern shown in FIG. 4 are converted into intermediate-brightness patterns.

DESCRIPTION OF THE PREFERRED EMBODIMENT

Figures 1A, 1B:
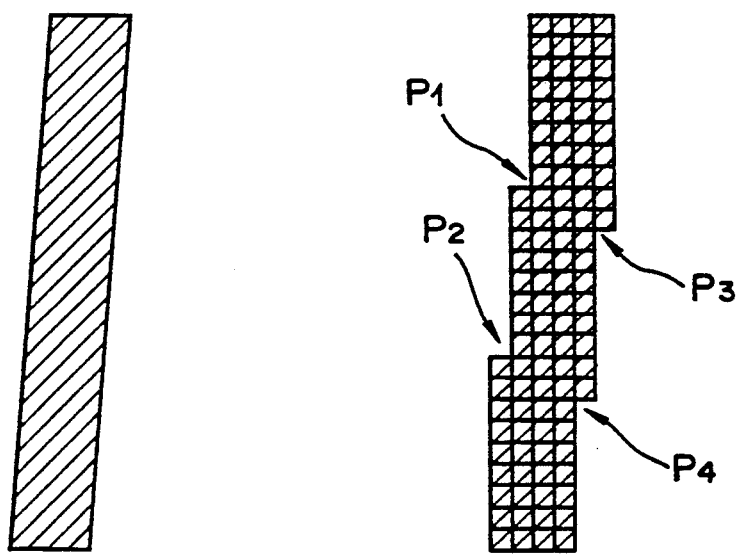
FIGS. 1A and 1B are diagrams for describing an example of dot-pattern conversion according to the prior art.
Figure 2:
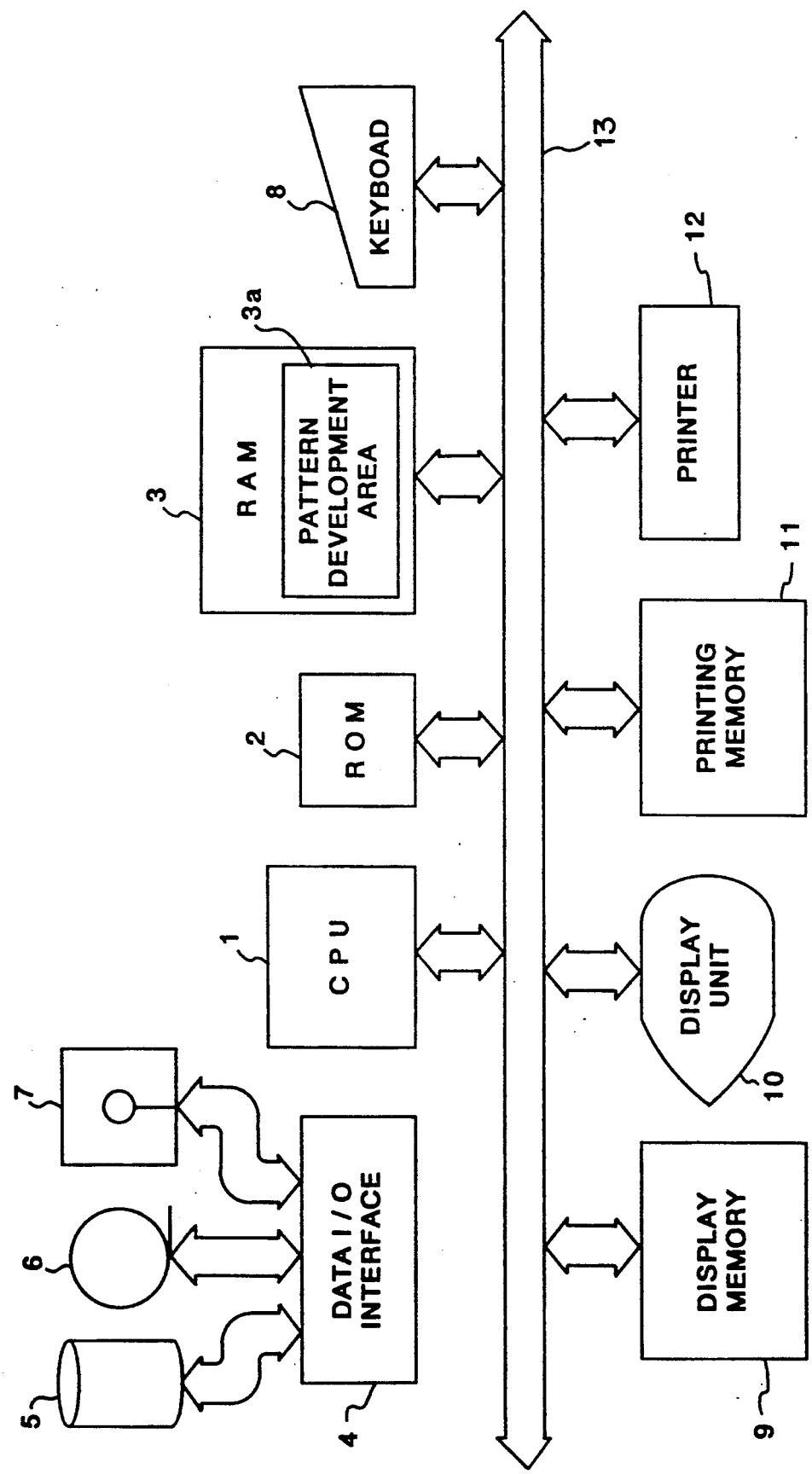
FIG. 2 is a block diagram illustrating the construction of an image processing apparatus according to an embodiment of the present invention.

FIG. 2 is a block diagram illustrating the construction of an image processing apparatus according to an embodiment of the invention. As shown in FIG. 2, the apparatus includes a CPU 1 for controlling the overall apparatus, a ROM 2 storing a control program, an error processing program and a program in accordance with the flowchart shown in FIG. 3, described below, a RAM 3 used as the working area of each type of program and a temporary saving area for error correction data, a data I/O interface 4 for input/output of data with respect to an external storage unit, a hard disk 5, magnetic tape 6 and floppy disk 7 each for preserving data, a keyboard 8 having keys for instructing data input/output as well as image editing according to the embodiment, a display memory 9, a display unit 10 for displaying an image based on a dot pattern developed in the display memory 9, a printing memory 11, a printer 12 for forming a visible image based on image data developed in the printing memory 11, and a bus line 13 for transmitting address signal, data and various control signals within the apparatus.

A pattern conversion method according to the embodiment will now be described.

FIG. 4 is a diagram showing an example of an image pattern composed of dots, and FIGS. 5A, 5B and 5C are diagrams for describing steps through which contour dots of the image pattern shown in FIG. 4 are converted into intermediate-brightness patterns. As shown in FIG. 4, numeral 100 denotes an image pattern serving as one example. At a first step illustrated in FIG. 5A, a specific pattern is identified from rows of dots of pixels (hereinafter referred to as "contour dots") forming a contour from the image pattern 100. A method of identifying the specific pattern will now be described. In FIG. 5A, dot rows enclosed by the bold line within the dot rows of the contour dots indicate a specific pattern 101 according to the embodiment. The specific pattern 101 is one example of a specific pattern extending vertically in FIG. 5A. In the specific pattern of this embodiment, first there is a step of one dot (the portion indicated by arrow A in FIG. 5A) in a row of dots extending continuously in the vertical or horizontal direction. Second, dot rows 101a, 101b which each include two dots forming the step portion A each consist of three or more continuous dots. The requirements of a specific pattern are that both of these points hold at the same time. In the example of FIG. 5A, the specific pattern 101 satisfies these two conditions because the dot rows 101a, 101b which extend continuously in the vertical direction are each composed of six continuous dots and have a step portion equivalent to one dot in the horizontal direction. The specific pattern 101 is identified from image pattern 100 in this manner. When identification of the specific pattern is completed, a transition is made to a step for editing the specific pattern. First, at a second step (FIG. 5B), in order to convert the specific pattern 101 into a desired intermediate-brightness pattern, a region 102 of two dots existing in front and rear of a step portion of one dot is detected. Processing then proceeds to a third step (FIG. 5C), at which dot-inversion processing of the region 102 is performed. As a result, the specific pattern 101 is converted into an intermediate-brightness pattern indicated at 101' in FIG. 5C. An image pattern having the intermediate-brightness pattern 101' is outputted as an output image pattern 100'.

The procedure for performing this conversion of an image pattern according to the preferred embodiment will now be described.

Figure 3:
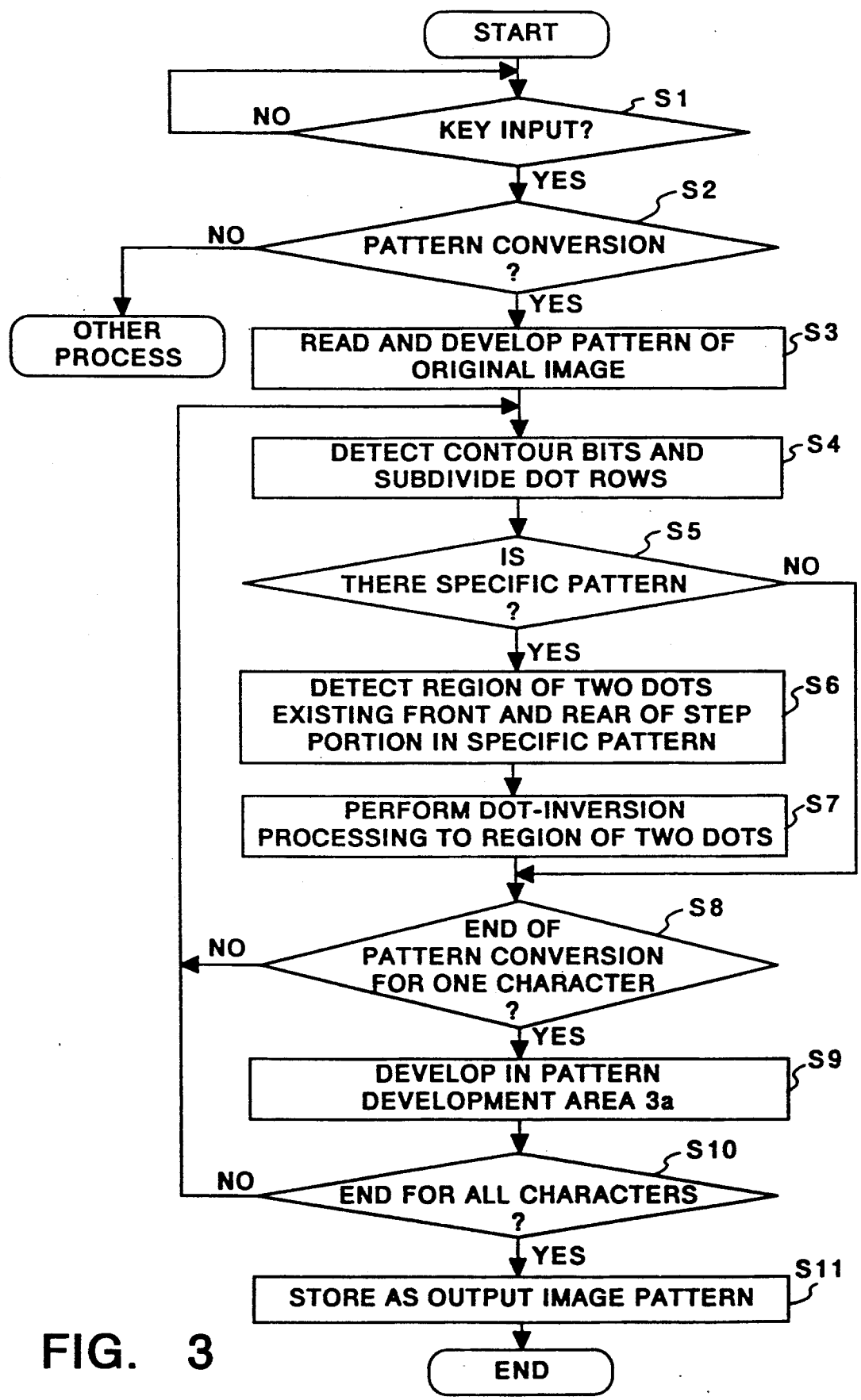
FIG. 3 is a flowchart for describing the operating procedure of image pattern conversion processing performed by the CPU in the apparatus of FIG. 1.
Figure 6C:
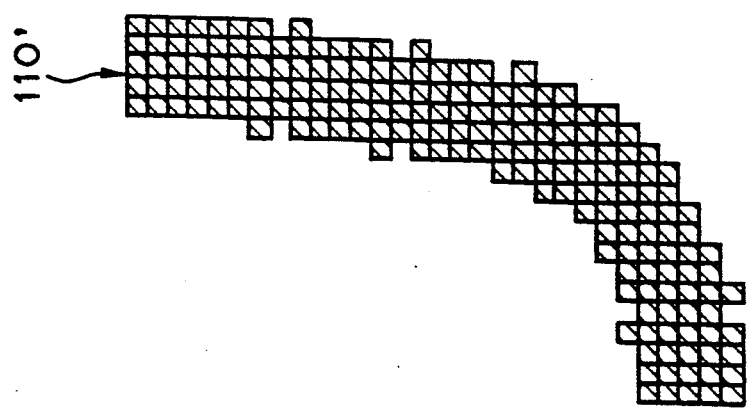
FIGS. 6A, 6B and 6C are diagrams for describing editing steps when performing a pattern conversion in accordance with the flowchart of FIG. 3.
Figure 6B:
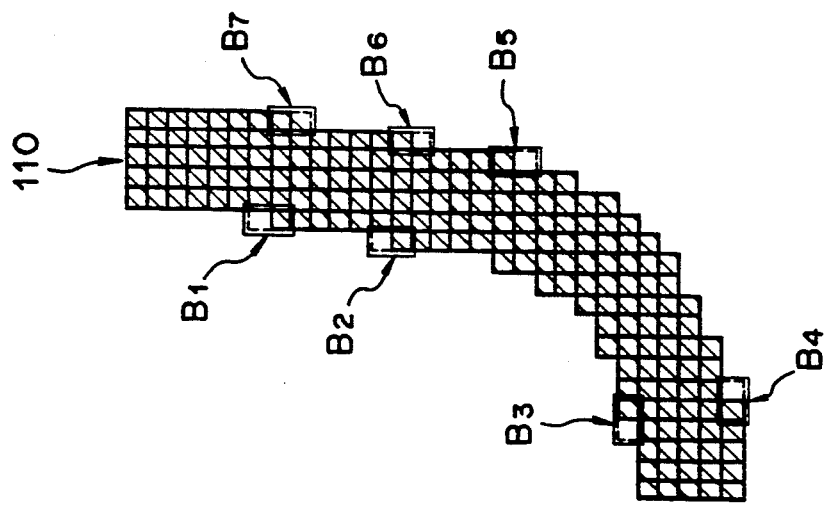
Figure 6A:
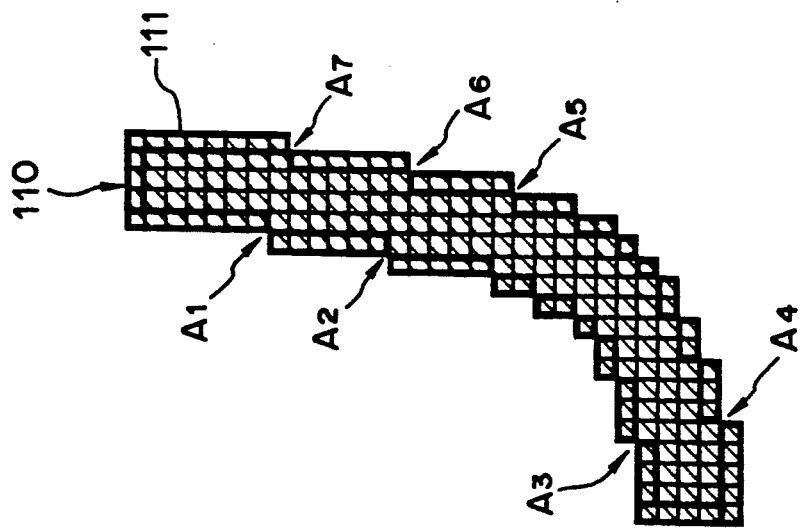

FIG. 3 is a flowchart for describing the operating procedure of image pattern conversion processing performed by the CPU 1 of this embodiment, and FIGS. 6A, 6B and 6C are diagrams for describing editing steps when performing a pattern conversion in accordance with the flowchart of FIG. 3. The description will be based on an example in which the pattern conversion is applied to a document image formed by a character font pattern.

First, when processing for image-pattern conversion according to the embodiment is designated by a key input (steps S1, S2 in FIG. 3), pattern data of an original image composed of dots are read out the hard disk 5, magnetic tape 6 or floppy disk 7. The read pattern data of the original image are developed in the working area of the RAM 3 (step S3). Thereafter, the contour dots in the pattern data of the original image are detected in accordance with a rule, described below. The character " ) ", in the Japanese katakana syllabary shown in FIG. 6A will be taken as an example. In FIG. 6A, numeral 110 indicates the original image pattern of the character " ) ", and numeral 111 shows contour dots of the original image pattern 110. Contour dots 111 are detected from the rows of pixels forming the contour of the original image pattern 110, and subdivision of the dot rows is carried out in the manner of the contour dots enclosed by the bold lines. In this case, the contour dots are subdivided from the dot rows every step portion or whenever there is a change in horizontal and vertical directivity in the dot row direction, and the dot rows are obtained (step S4). Next, it is determined (step S5) whether there is a pattern corresponding to the above-mentioned specific pattern for each and every continuous dot row obtained by the subdivision of step S4. The portions indicated at A1 through A7 in FIG. 6A are step portions which satisfy the requirement that two dot rows continuous at the contour portion are judged to be specific patterns. The description of a portion so judged is in accordance with the description of FIGS. 5A, 5B, 5C and therefore is omitted here. Accordingly, a subdivision which includes one of the step portions A1 through A7 is judged to be a specific pattern at step S5. The region for performing the dot-inversion processing, namely, the region of two dots existing in front and rear of a step portion in the specific pattern is decided in order to convert the specific pattern into an intermediate-brightness pattern (Step S6). In FIG. 6B, B1 through B7 indicate corresponding dot-inversion processing portions for every specific pattern which includes one of the step portions A1 through A7. Next, dot-inversion processing is carried out (step S7). As shown in FIG. 6C, this processing is performed in order that the contour of the original image pattern 110 may be expressed in intermediate brightness by converting the specific patterns of contour dots 111 into intermediate-brightness patterns. The processing from step S4 to step S6 is repeated until the conversion processing ends for all specific patterns that include the step portions A1 through A7 (step S8). Here, in the case of the character " ) ", it will suffice to apply the conversion processing solely to the original image pattern 110 since the character consists of one stroke. However, in case of a character composed of a plurality of strokes, the conversion processing is applied to the whole contour. An output image pattern of an entire character is thus formed.

Next, the image pattern for which pattern conversion has been completed is developed as an output image pattern 110' in a pattern development area 3a of RAM 3 (step S9). Thereafter, the processing of steps S4 through S9 is repeated until pattern conversion ends for all characters, namely for all of the other characters on one page of the document. When all processing is thus completed (Step S10), processing for storing each output pattern, which has been developed in the pattern development area 3a, in a prescribed external storage unit is executed (step S11). Selection of the external storage unit at step S11 can be set at will by the user. Alternatively, it can be set so that the original image pattern is returned to the external storage unit from which it was read. Though the original image pattern is a character hereinabove, it goes without saying that an original image pattern formed into a pattern by a font or other graphic also can be the object of pattern conversion according to this embodiment.

Furthermore, other examples of methods for judging specific patterns include a method in which a dot pattern in a certain subdivision of contour dots is identified by being matched with a specific pattern predetermined from a row of dots, and a method in which a dot pattern corresponding to contour dots is pursued from a certain direction, the number of dots extending continuously in the horizontal or vertical direction is counted, step portions are also verified at the same time, and a specific pattern is identified from the number of dots before and after a step portion. These types of identification processing can be incorporated as modifications in steps S4 and S5 of FIG. 3.

Thus, in accordance with the embodiment described above, a high-quality image pattern in which the roughness or irregularity of contour dots of an image is not conspicuous can be obtained through a simple arrangement.

In a case where a specific pattern is judged to exist in the above-described embodiment, it is assumed that two dot rows have a step portion defined by rows or strings consisting of three or more dots each. However, the present invention is not limited to such an arrangement, for the dot rows can consist of two dots, or of any arbitrary number of four or more.

For the purpose of performing a visual correction of a dot step portion, namely for the purpose of achieving an expression of intermediate brightness, the rules for effecting the pattern conversion to the intermediate-brightness pattern can be modified in various ways so long as the pattern is an intermediate-brightness pattern which attains this purpose. Of course, it is possible to prepare a plurality of types of intermediate-brightness patterns and have the user select one via a key input from the keyboard 108. In this case, one of the two dot rows having a step portion among the specific patterns may have n (e.g., n>2) or more dots and the other dot row may be classified into a two-dot case, three-dot case, four-dot case and so on, and editing may be made more complex as by increasing the addition portion as the number of dots increases.

In the embodiment described above, an image processing apparatus such as a personal computer or word processor is taken as an example. However, the invention is not limited to such an arrangement but can be applied, within the scope of the claims, to a discrete device which performs image editing, namely an arrangement having a data I/O interface for external equipment, a CPU, a ROM and a RAM, in which contour dots of an image pattern are merely converted into an expression of intermediate brightness automatically.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting an original image pattern composed of dots;
   detecting means for detecting contour dots from the original image pattern inputted by said input means;
   identifying means for identifying a pattern of dot rows formed by the contour dots detected by said detecting means;
   editing means for editing the original image pattern, which is inputted by said input means, based on the pattern identified by said identifying means; and
   output means for outputting results of editing performed by said editing means,
   wherein said detecting means further comprises subdividing means for subdividing rows of the contour dots in accordance with a predetermined method.

2. The apparatus according to claim 1, wherein said subdividing means subdivides the dot rows at every predetermined step portion and converts each dot row into a pattern in a dot row where the contour dots extend in a main scanning direction or in an auxiliary scanning direction.

3. The apparatus according to claim 2, wherein said predetermined step is one dot.

4. An image processing apparatus comprising:
   input means for inputting an original image pattern composed of dots;
   detecting means for detecting contour dots from the original image pattern inputted by said input means;
   identifying means for identifying a pattern of dot rows formed by the contour dots detected by said detecting means;
   editing means for editing the original image pattern, which is inputted by said input means, based on the pattern identified by said identifying means; and
   output means for outputting results of editing performed by said editing means,
   wherein said identifying means further comprises matching means for matching a dot row at an arbitrary position of the contour dots and a predetermined pattern, wherein a dot row which is made to coincide with said predetermined pattern by said matching means is subjected to editing performed by said editing means.

5. The apparatus according to claim 4, further comprising memory means for storing said predetermined pattern.

6. An image processing comprising:
   input means for inputting an original image pattern composed of dots;
   detecting means for detecting contour dots from the original image pattern inputted by said input means;
   identifying means for identifying a pattern of dot rows formed by the contour dots detected by said detecting means;
   editing means for editing the original image pattern, which is inputted by said input means, based on the pattern identified by said identifying means; and
   output means for outputting results of editing performed by said editing means,
   wherein said identifying means further comprises counting means for counting a number of the contour dots extending continuously in one direction which is a main scanning direction or an auxiliary scanning direction, wherein if a predetermined step portion is found to exist while said counting means is counting in said one direction, the object of editing performed by said editing means is decided in dependence upon the number of dots in each dot row subdivided at said predetermined step portion.

7. The apparatus according to claim 6, wherein said number of dots used in deciding the object of editing is at least two.

8. The apparatus according to claim 6, wherein said predetermined step portion is one dot.

9. An image processing apparatus comprising:
input means for inputting an original image pattern composed of dots;
detecting means for detecting contour dots from the original image pattern inputted by said input means;
identifying means for identifying a pattern of dot rows formed by the contour dots detected by said detecting means;
editing means for editing the original image pattern, which is inputted by said input means, based on the pattern identified by said identifying means; and
output means for outputting results of editing performed by said editing means,
wherein said editing means further comprises converting means for converting a dot row formed by the contour dots into another dot row.

10. The apparatus according to claim 9, wherein said converting means further comprises adding means for adding a dot to a dot row formed by the contour dots.

11. An image processing apparatus comprising:
input means for inputting an original image pattern composed of dots;
detecting means for detecting contour dots from the original image pattern inputted by said input means;
identifying means for identifying a pattern of dot rows formed by the contour dots detected by said detecting means;
decision means for deciding, based on the pattern identified by said identifying means, editing contents of the original image pattern inputted by said input means;
editing means for editing the original image pattern, which is inputted by said input means, in accordance with the editing contents decided by said editing means; and
output means for outputting results of editing performed by said editing means,
wherein said detecting means further comprises subdividing means for subdividing rows of the contour dots in accordance with a predetermined method.

12. The apparatus according to claim 11, wherein said subdividing means subdivides the dot rows at every predetermined step portion and converts each dot row into a pattern in a dot row wherein the contour dots extend in a main scanning direction or in an auxiliary scanning direction.

13. The apparatus according to claim 12, wherein said predetermined step is one dot.

14. An image processing apparatus comprising:
input means for inputting an original image pattern composed of dots;
detecting means for detecting contour dots from the original image pattern inputted by said input means;
identifying means for identifying a pattern of dot rows formed by the contour dots detected by said detecting means;
decision means for deciding, based on the pattern identified by said identifying means, editing contents of the original image pattern inputted by said input means;
editing means for editing the original image pattern, which is inputted by said input means, in accordance with the editing contents, decided by said editing means; and
output means for outputting results of editing performed by said editing means,
wherein said identifying means further comprises matching means for matching a dot row at an arbitrary comprises matching means for matching a dot row at an arbitrary position of the contour dots and a predetermined pattern, wherein a dot row which is made to coincide with said predetermined pattern by said matching means is subjected to editing performed by said editing means.

15. The apparatus according to claim 14, further comprising memory means for storing said predetermined pattern.

16. An image processing apparatus comprising:
input means for inputting an original image pattern composed of dots;
detecting means for inputting an original image pattern composed of dots;
detecting means for detecting contour dots from the original image pattern inputted by said input means;
identifying mans for identifying a pattern of dot rows formed by the contour dots detected by said detecting means;
decision means for deciding, based on the pattern identified by said identifying means, editing contents of the original image pattern inputted by said input means;
editing means for editing the original image pattern, which is inputted by said input means, in accordance with the editing contents decided by said editing means; and
output means for outputting results of editing performed by said editing means,
wherein said identifying means further comprises counting means for counting a number of the contour dots extending continuously in one direction which is a main scanning direction or an auxiliary scanning direction, wherein if a predetermined step portion is found to exist while said counting means is counting in said one direction, the object of editing performed by said editing means is decided in dependence upon the number of dots in each row subdivided at said predetermined step portion.

17. The apparatus according to claim 16, wherein said number of dots used in deciding the object of editing is at least two.

18. The apparatus according to claim 16, wherein said predetermined step portion is one dot.

19. An image processing apparatus comprising:
input means for inputting an original image pattern composed of dots;
detecting means for detecting contour dots from the original image pattern inputted by said input means;
identifying means for identifying a pattern of dot rows formed by the contour dots detected by said detecting means;
decision means for deciding, based on the pattern identified by said identifying means, editing contents of the original image pattern inputted by said input means;
editing means for editing the original image pattern, which is inputted by said input means, in accordance with the editing contents decided by said editing means;

output means for outputting results of editing performed by said editing means; and memory means for storing said editing contents of plural types, wherein said decision means further comprises selecting means for selecting editing contents, which correspond to a pattern identified by said identifying means, from the editing contents of plural types stored in said memory means.

20. An image processing apparatus comprising:

input means for inputting an original image pattern composed of dots;

detecting means for detecting contour dots from the original image pattern inputted by said input means;

identifying means for identifying a pattern of dot rows formed by the contour dots detected by said detecting means;

decision means for deciding, based on the pattern identified by said identifying means, editing contents of the original image pattern inputted by said input means;

editing means for editing the original image pattern, which is inputted by said input means, in accordance with the editing contents decided by said editing means; and output means for outputting results of editing performed by said editing means, wherein said editing means further comprises converting means for converting a dot row formed by the contour dots into another dot row.

21. The apparatus according to claim 20, wherein said converting means further comprises:

adding means for adding a dot to a dot row formed by the contour dots; and deleting means for deleting a dot from a dot row formed by the contour dots.

* * * * *

UNITED STATES PATENT AND TRADEMARK OFFICE
CERTIFICATE OF CORRECTION

PATENT NO. : 5,091,973
DATED : February 25, 1992
INVENTOR(S) : Kiyoshi Watanabe

It is certified that error appears in the above-indentified patent and that said Letters Patent is hereby corrected as shown below:

```
Column 7, line 39, "editing means;" should read --decision means;--.
Column 8, line 2,  "editing means;" should read -decision means;--.
          line 34, "editing means;" should read --decision means;--.
          line 68, "editing means;" should read --decision means;--.
Column 10, line 8, "editing means;" should read --decision means;--.
```

Signed and Sealed this

Thirtieth Day of November, 1993

Attest:

BRUCE LEHMAN

*Attesting Officer*  *Commissioner of Patents and Trademarks*